United States Patent
Walkowski et al.

(10) Patent No.: US 7,165,583 B1
(45) Date of Patent: Jan. 23, 2007

(54) DOOR LATCH FOR CAPLESS FILLER NECK

(75) Inventors: Paul D. Walkowski, Ann Arbor, MI (US); Kenneth M. Spink, Jerome, MI (US); Robert P. Benjey, Dexter, MI (US)

(73) Assignee: Eaton Corporation, Clevland, OH (US)

( * ) Notice: Subject to any disclaimer, the term of this patent is extended or adjusted under 35 U.S.C. 154(b) by 0 days.

(21) Appl. No.: 11/047,201

(22) Filed: Jan. 31, 2005

(51) Int. Cl.
*B65B 1/04* (2006.01)

(52) U.S. Cl. ............... 141/350; 220/86.2; 220/DIG. 33

(58) Field of Classification Search ............... 141/349, 141/350, 301; 220/86.2, DIG. 33
See application file for complete search history.

(56) References Cited

U.S. PATENT DOCUMENTS

| | | | | |
|---|---|---|---|---|
| 3,133,741 A | * | 5/1964 | Garabello | ................... 280/834 |
| 5,145,081 A | * | 9/1992 | Gravino | ..................... 220/86.2 |
| 5,732,842 A | * | 3/1998 | Krause et al. | ........... 220/254.1 |
| 6,009,920 A | | 1/2000 | Palvoelgyi | |
| 6,092,685 A | | 7/2000 | Gruber | |
| 6,155,316 A | | 12/2000 | Benjey | |
| 6,279,626 B1 | * | 8/2001 | Schmitt et al. | .............. 141/348 |

\* cited by examiner

*Primary Examiner*—Steven O. Douglas
(74) *Attorney, Agent, or Firm*—Anna M. Shih

(57) ABSTRACT

A capless filler neck creates a vapor-tight closure for a fuel system using a spring-loaded door and a latch structure that anchors the door to create a vapor-tight seal. The filler neck includes a spring that biases the door shut and a wedge arrangement that acts as the latching structure. The wedge arrangement includes a movable plate that selectively engages with the door to pull the door shut with sufficient force to form and maintain the vapor-tight seal.

16 Claims, 3 Drawing Sheets

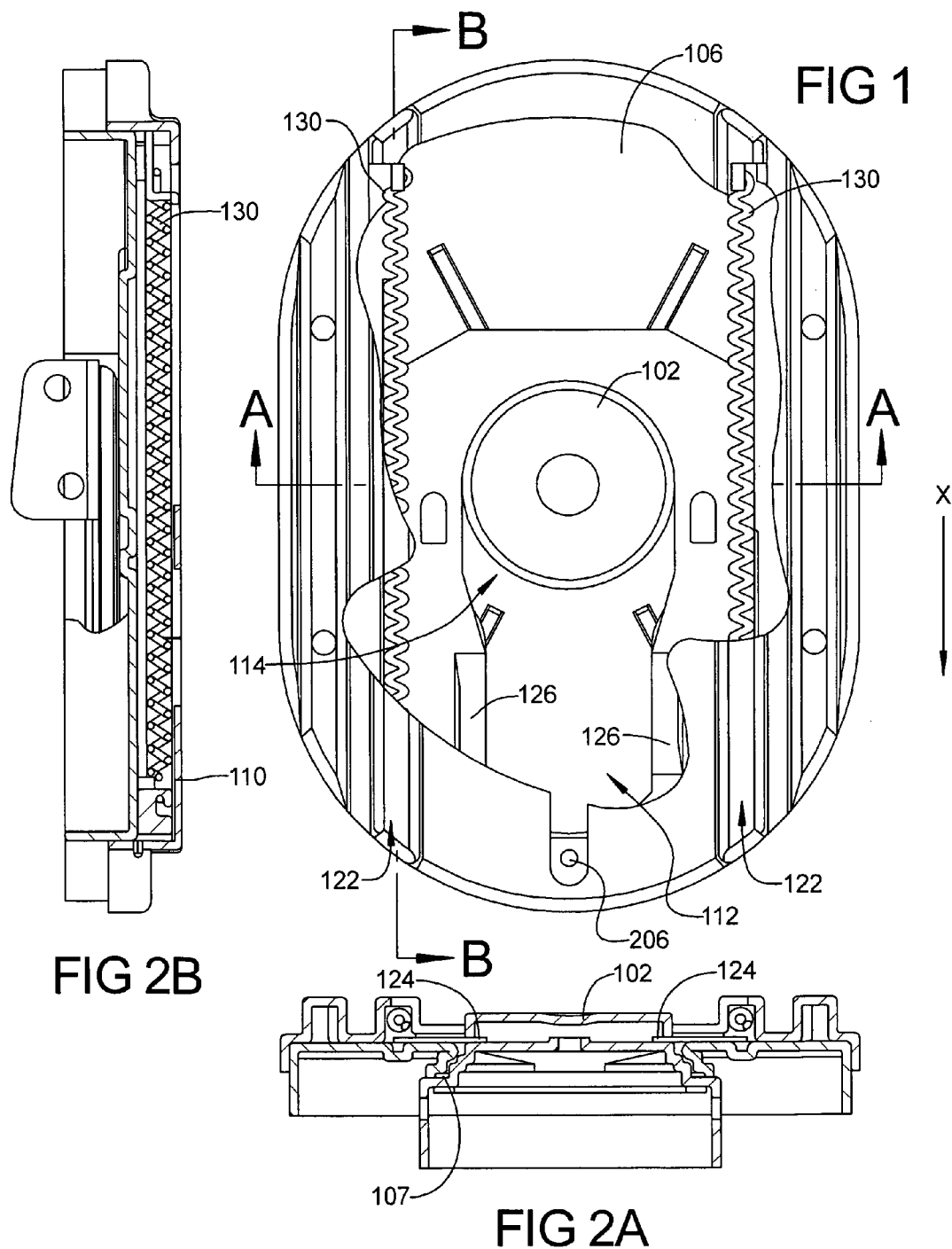

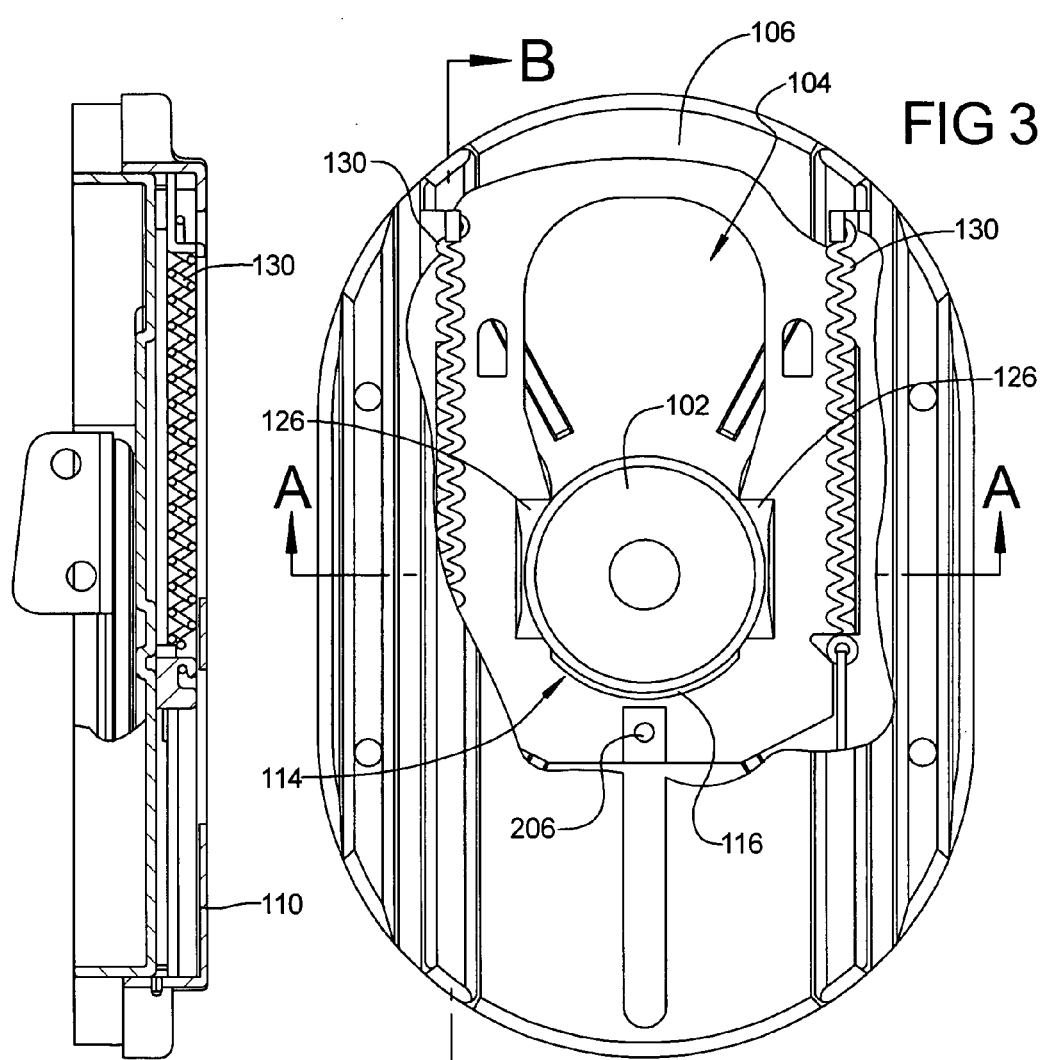
FIG 3
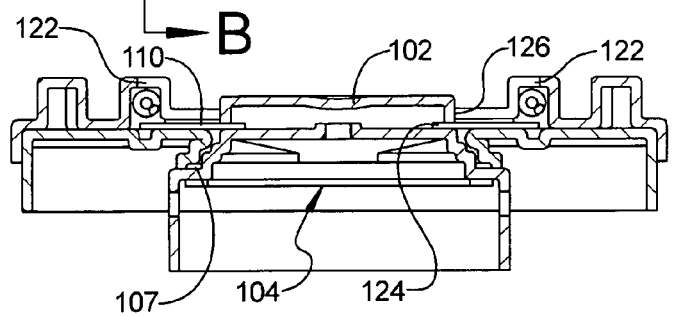
FIG 4B
FIG 4A

DOOR LATCH FOR CAPLESS FILLER NECK

TECHNICAL FIELD

The present invention relates to filler tube closures, and more particularly to a vapor-tight closure for a fuel tank.

BACKGROUND OF THE INVENTION

Vehicle emissions standards have become increasingly stringent due to the increased knowledge of the negative environmental effects of hydrocarbon emissions, which are generated by fuel vapors into the atmosphere. For vehicles and other fuel-operated devices, controlling and containing fuel vapors is of great importance in reducing emissions. Most vehicles contain an on-board diagnostics system that monitors whether the fuel system is completely vapor-tight. Although it is relatively easy to contain vapors when they are already in the fuel system, the greatest amount of vapor tends to be generated by the refueling process rather than vehicle operation. Past studies have shown that more hydrocarbon emissions were generated during the refueling process than when the entire tank of fuel is actually burned.

More particularly, the refueling process requires a user to remove a closure, such as a gas cap, which seals a filler tube in the fuel system when the gas cap is attached to the filler tube. Although the gas cap is normally designed to be vapor-tight when it is attached to the filler tube, it is common for users to replace the gas cap too loosely, creating a leak. Although some fuel systems have a spring-loaded flapper that shuts the nozzle opening, this flapper simply closes the opening without sealing it. The leak in the fuel system caused by the loose gas cap is detectable by the on-board diagnostics system in the vehicle, which usually indicates the leak by illuminating a "check engine" light. However, because the "check engine" light itself does not specifically indicate that the leak is the problem, diagnosing the leak at the gas cap is time-consuming and inconvenient, particularly in view of how commonly loose caps occur due to user error.

There is a desire for a filler tube closure that can create a vapor-tight seal in a reliable fashion.

SUMMARY OF THE INVENTION

The present invention is directed to a capless filler neck that creates a vapor-tight closure for a fuel system without relying on a user to properly attach a gas cap to create a seal. The capless filler neck includes a spring-biased flapper at the filler neck opening and a latch assembly that anchors the flapper to create a vapor-tight seal. The filler neck includes a spring that biases the flapper shut and a wedge arrangement that engages with the flapper to hold the flapper shut with sufficient force to form the vapor-tight seal.

In one embodiment, the wedge arrangement includes a movable plate configured to release the flapper in a released position and to engage with the flapper in a latched position. Either the plate or the flapper may have a groove with a ramp for engagement. Because the flapper and the plate are wedged together when the flapper is engaged with the plate, the flapper is pulled securely to compress a seal disposed on the flapper. Moreover, the engagement between the flapper and the plate ensures that the flapper is held securely with a relatively high amount of force to maintain the vapor-tight seal.

BRIEF DESCRIPTION OF THE DRAWINGS

FIG. 1 is a plan view of a latch assembly according to one embodiment of the invention in a released position;

FIGS. 2A and 2B are section views of FIG. 1 taken along lines A—A and lines B—B, respectively;

FIG. 3 is a plan view of the latch assembly of FIG. 1 in a latched position;

FIGS. 4A and 4B are section views of FIG. 3 taken along lines A—A and B—B; respectively;

DETAILED DESCRIPTION OF THE EMBODIMENTS

Figure 5:
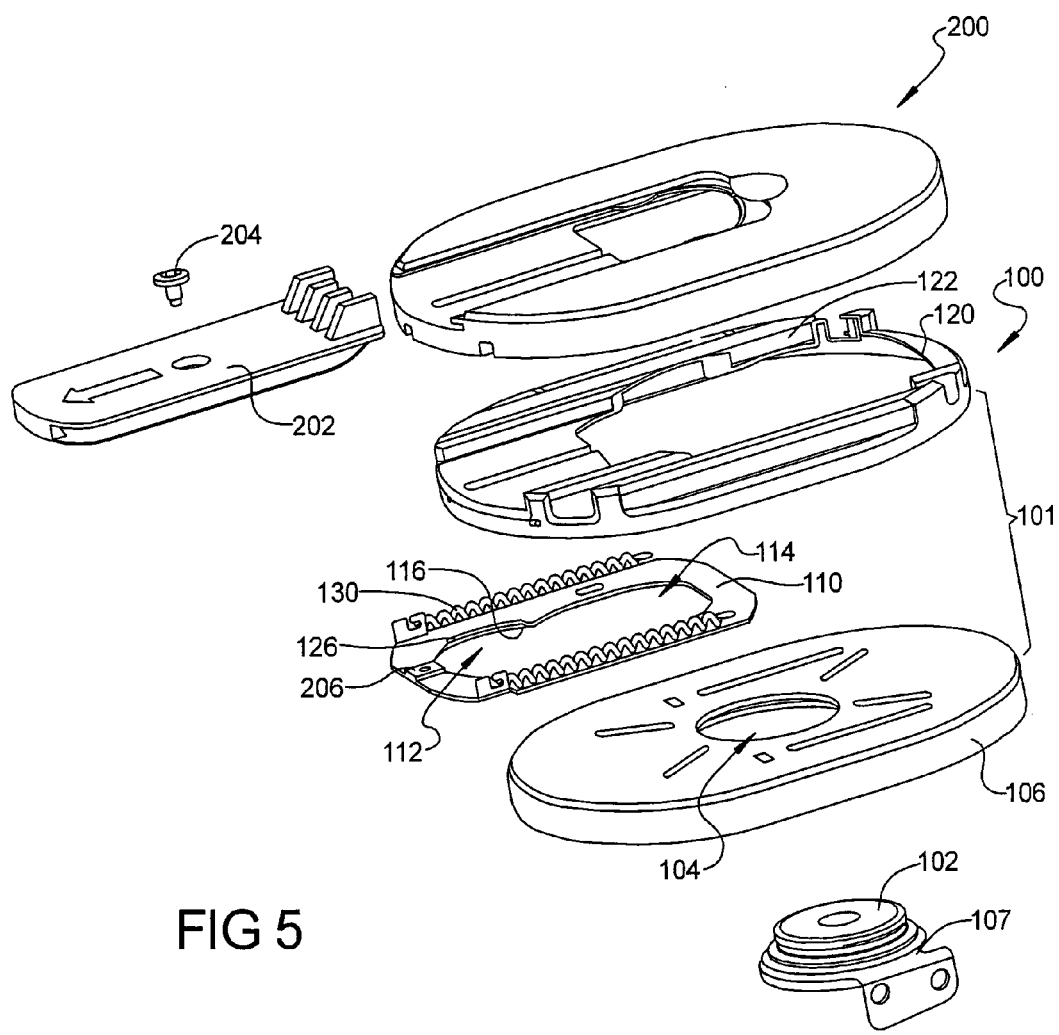
FIG. 5 is an exploded view of the latch assembly of FIG. 1 with an optional protective cover.

FIG. 5 illustrates components in a capless filler neck system 100 having a latch assembly 101 that secures and seals a flapper 102 in a filler neck opening 104. The filler neck opening 104 is formed in a support 106 that supports the latch assembly 101. The flapper 102 itself may be in the form of any movable door that closes the filler neck opening 104. In one embodiment, the flapper 102 has a seal 107 formed around its periphery to create a vapor-tight closure when the flapper 102 is latched by the latch assembly 101 against the support 106. The flapper 102 is movable between an open position and a closed position.

The latch assembly 101 itself includes a movable plate 110 that slides or otherwise moves on top of the support 106, preferably in a linear fashion, between a released position and a latched position. Note that although the illustrated embodiment shows a sliding plate 110, the plate 110 can move in any fashion to latch the latch assembly 101 without departing from the scope of the invention. The movable plate 110 in the illustrated embodiment has a keyhole-shaped opening 112 having a release portion 114 and a latch portion 116. As shown in the Figures, the release portion 114 is large enough to allow the flapper 102 to move freely without touching the movable plate 110 when the movable plate 110 is in the released position. The latch portion 116 is configured so that it is smaller than the flapper 102 in at least one dimension so that the flapper 102 and the area of the movable plate 110 surrounding the latch portion 116 engage with each other when the movable plate 110 is in the latched position. In an alternative embodiment, the plate 110 may have a generally U-shaped configuration having only the latch portion 116. This reduces the overall length of the plate 110 by omitting the release portion 114.

In one embodiment, the flapper 102 has slots 124 formed on opposing portions of its circumferential edge, and the movable plate 110 has engagement portions, such as ramp portions 126, formed on areas corresponding to the slots 124. However, the reverse configuration may also be used (i.e., with the slots 124 on the movable plate 110 and the ramp portions 126 on the flapper 102) without departing from the scope of the invention. The actual dimensions of the ramp portions 126 may include, for example, a subtle change in the thickness of the movable plate 110 to create a wedging action between the slots 124 and the ramp portions 126 when the movable plate 110 and the flapper 102 engage with each other completely. This wedging action holds the flapper 102 securely in place with a high amount of force.

The travel path of the movable plate 110 may be restricted by a guide structure 120, such as guide channels 122, grooves, ridges, or other similar structures. Note that although FIG. 5 shows the guide structure 120 as a separate component that also acts as an impact and as a locator for the resilient member 130, in the latch assembly 101, the guide channels 122 or other guide structures may be integrated into the support 106 itself, as well. One or more resilient members 130 are attached to the movable plate 110 to bias the movable plate 110 toward the latched position. This ensures that the flapper 102 is latched automatically when the movable plate 110 is in its default position (i.e., the latched position).

Referring to FIGS. 1, 2A, and 2B, moving the movable plate 110 in the direction of arrow X against the biasing force of the resilient member 130 (e.g., during a refueling process) pulls the movable plate 110 so that the flapper 102 is disposed in the release portion 114 of the opening 112 in the movable plate 110. This action disengages the movable plate 110 from the flapper 102, allowing the flapper 102 to be moved easily to the open position by, for example, a fuel nozzle.

Referring to FIGS. 3, 4A, and 4B, when the fuel nozzle is removed from the filler neck opening 104, the biasing force of the resilient member 130 causes the movable plate 110 to move toward the latched position. This causes the ramp portions 126 on the movable plate 110 to engage with the slots 124 on the flapper 102, pulling the flapper 102 slightly closer toward the support 106. The pulling action compresses the seal 107 against the underside of the support 106 to form a vapor-tight seal.

By incorporating a latching structure having a latching plate that engages with the flapper in a wedged fashion only when the door is closed, the invention ensures that the amount of force needed to open the door is minimized while at the same time ensuring that the forces holding the flapper closed are high enough to maintain a vapor-tight seal and to prevent the flapper from inadvertently opening, even when a force is applied to the flapper 102. The wedged latching structure provides these functions without requiring complicated rotating mechanisms or multiple latches to hold the flapper 102 in place and eliminate a chamber outside of the flapper 102 and seal 107 where trapped liquid may reside.

The inventive latch structure may be used in conjunction with a protective cover 200 having a sliding door 202, such as the cover described in commonly-assigned U.S. application Ser. No. 11/047,071. FIG. 5 illustrates capless filler neck system 100 with the cover 200. The door 202 on the cover is coupled to the movable plate 110 so that the door 202 and the plate 110 can be moved simultaneously simply by moving the door 202 alone. The cover 200 protects the latch assembly 101 and flapper 102 from being damaged by environmental contaminants. In the illustrated embodiment, a retainer 204, such as a bolt or a pin, on the door 202 engages with an engagement structure, such as a protrusion 206, on the movable plate 110 when the door 202 is moved toward the open position. Note that any engagement structure is possible without departing from the scope of the invention; for example; the door 202 may be configured to have a protrusion for engaging with the movable plate 110.

The engagement between the retainer 204 on the door 202 and the protrusion 206 causes the movable plate 110 to move to the released position when the door 202 is moved to the open position. Moreover, when the biasing force applied to the movable plate 110 by the resilient member 130 moves the movable plate 110 back toward the latched position, the engagement between the retainer 204 and the protrusion 206 causes the door 202 to move automatically toward the closed position through the same biasing force.

Linking the movement of the door 202 with the movement of the movable plate 110 allows the door 202 and the movable plate 110 to be moved in a single motion. During the refueling process, the user can simply press the tip of the fuel nozzle against the door 202 to open the door and unlatch the flapper 102 at the same time, freeing the flapper 102 so that the nozzle can be inserted into the filler neck opening 104. The nozzle holds the door 202 open and holds the in the unlatched position during refueling. Removal of the nozzle from the filler neck opening 104 frees the door 202 and the movable plate 110, causing the biasing force applied to the movable plate 110 by the resilient member 130 to push the movable plate 110 back to the latched position to pull the flapper 102 against the support 106 and seal the filler neck opening 104. At the same time, the biasing force also pulls the door 202 back to the closed position due to the engagement between the door 202 and the movable plate 110. As a result, incorporating the cover 200 allows the flapper 102 to be protected from harsh environmental conditions automatically when the nozzle is removed from the filler neck opening 104.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A latch assembly for a filler neck in a fuel system, comprising:
    a flapper that is movable between a closed position and an open position to close and open a filler neck opening: and
    a movable plate that is linearly movable between a latched position to engage the flapper and a released position to disengage the flapper, the plate having an opening with a latch portion that accommodates the flapper when the plate is in the latched position.

2. The latch assembly of claim 1, wherein one of the flapper and the plate has at least one slot and the other of the flapper and the plate has at least one engagement portion that engages with the slot when the plate is in the latched position.

3. The latch assembly of claim 2, wherein said at least one engagement portion comprises at least one ramp portion that wedges into said at least one slot to engage the flapper.

4. The latch assembly of claim 2, wherein said at least one slot comprises two opposing slots disposed on a circumferential edge of the flapper, and wherein said at least one engagement portion comprises two opposing ramp portions disposed around the latch portion of the opening in the plate.

5. The latch assembly of claim 1, further comprising at least one resilient member coupled to the plate to bias the plate toward the latched position.

6. The latch assembly of claim 1, further comprising a guide structure that guides movement of the plate.

7. The latch assembly of claim 1, wherein the plate includes an engagement structure configured to engage with a door on a protective cover.

8. The latch assembly of claim 1, wherein the flapper has a seal disposed on a circumferential edge, and wherein the latch assembly further comprises a support having the filler neck opening, wherein the plate is movable on top of the support and wherein the seal contacts the support when the plate is in the latched position to form a vapor-tight connection.

9. A capless filler neck for a fuel system, comprising:
a latch assembly having
a flapper that is movable between a closed position and an open position to close and open a filler neck opening, the flapper having a seal disposed on a circumferential edge,
a support having the filler neck opening,
a movable plate that is movable on the support between a latched position to engage the flapper and a released position to disengage the flapper, the plate having an opening with a latch portion that accommodates the flapper when the plate is in the latched position, wherein the seal contacts the support when the plate is in the engaged position to form a vapor-tight connection, and
at least one resilient member coupled to the plate to bias the plate toward the latched position; and
a cover having a door that is operatively coupled to the plate, wherein said at least one resilient member biases the door toward a closed position.

10. The capless filler neck of claim 9, wherein one of the flapper and the plate has at least one slot and the other of the flapper and the plate has at least one engagement portion that engages with the slot when the plate is in the latched position.

11. The capless filler neck of claim 10, wherein said at least one engagement portion comprises at least one ramp portion that wedges into said at least one slot to engage the flapper.

12. The capless filler neck of claim 10, wherein said at least one slot comprises two opposing slots disposed on a circumferential edge of the flapper, and wherein said at least one engagement portion comprises two opposing ramp portions disposed around the latch portion of the opening in the plate.

13. The capless filler neck of claim 10, further comprising a guide structure that guides the movement of the plate.

14. The capless filler neck of claim 13, wherein the guide structure is integrated with the support.

15. The latch assembly of claim 1, wherein the opening in the plate has a release portion that accommodates the flapper when the plate is in the released position.

16. The capless filler neck of claim 9, wherein the opening in the plate has a release portion that accommodates the flapper when the plate is in the released position.

* * * * *